March 22, 1949. I. P. THOMPSON ET AL 2,465,297
PROCESS AND APPARATUS FOR DISPOSING OF
METAL DESURFACING PRODUCTS
Filed Dec. 30, 1943 2 Sheets-Sheet 1
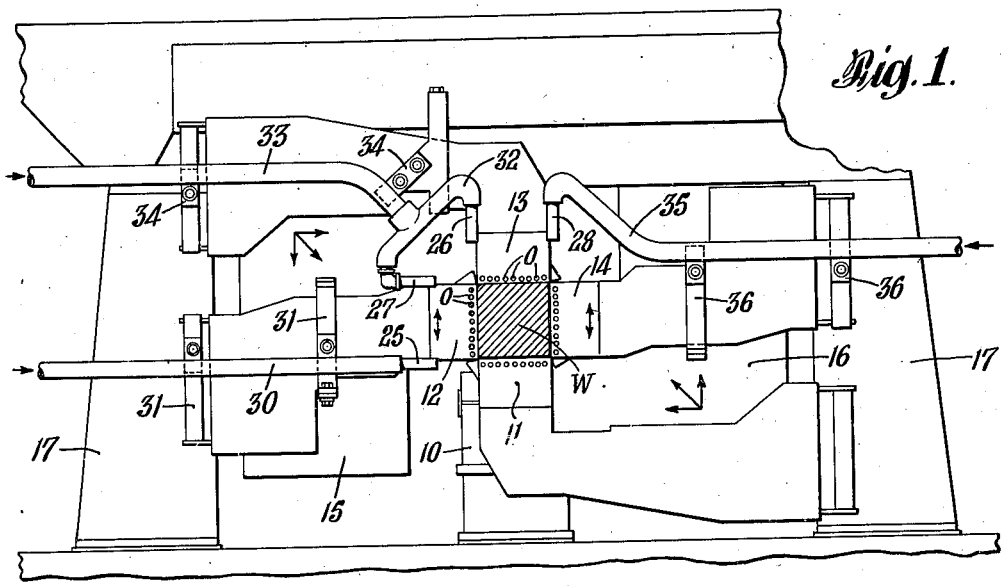
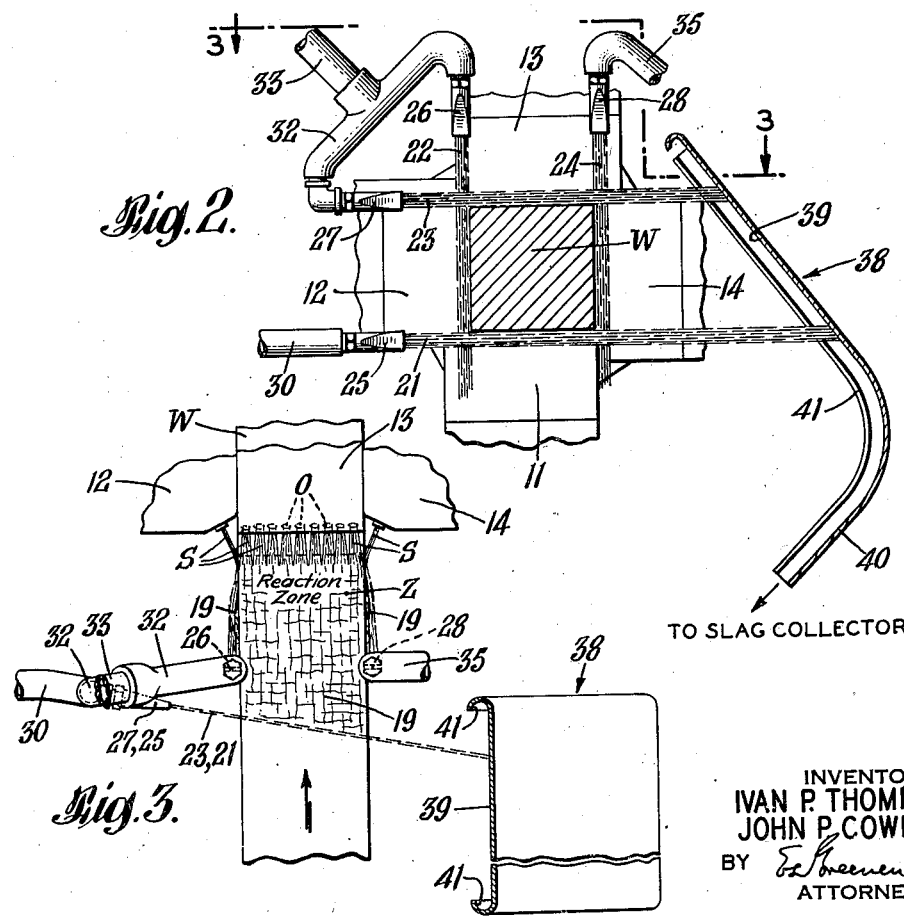
INVENTORS
IVAN P. THOMPSON
JOHN P. COWIE
BY Ed Greenewald
ATTORNEY

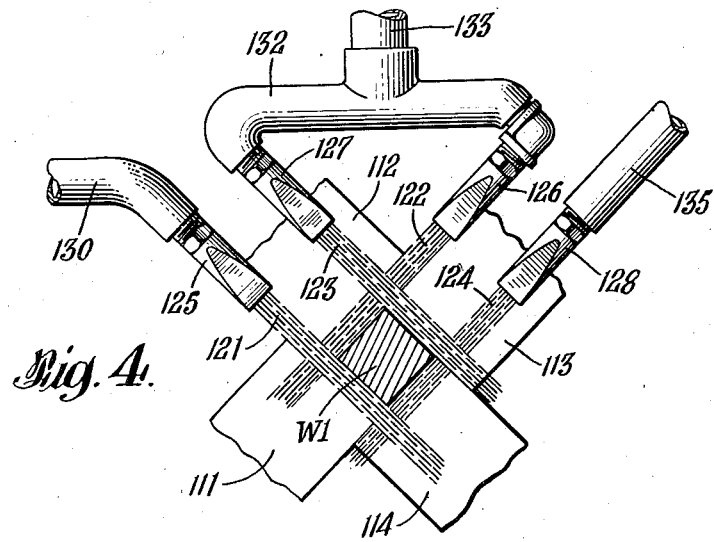
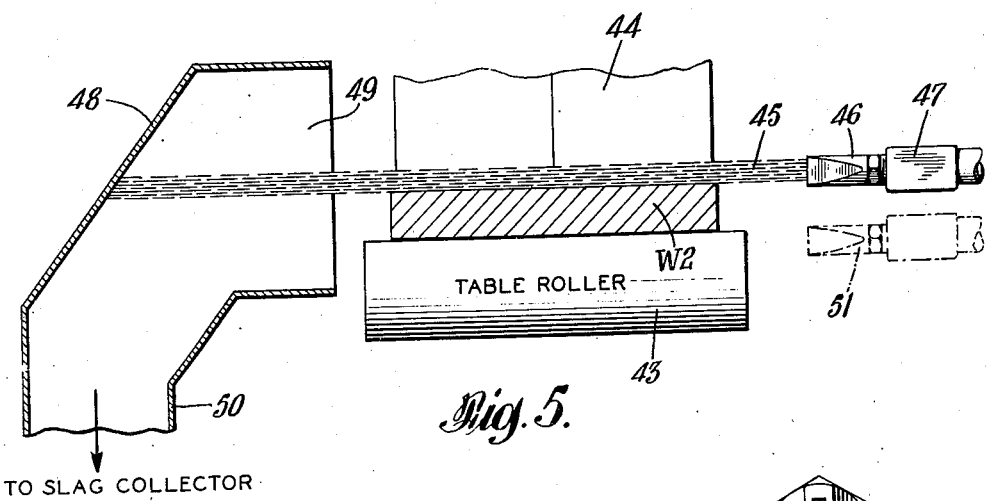
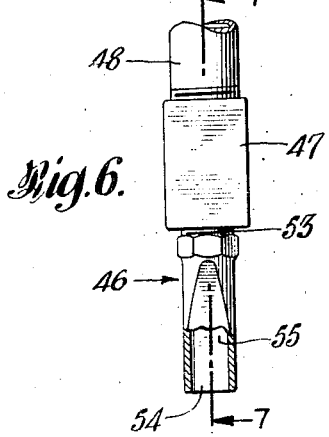
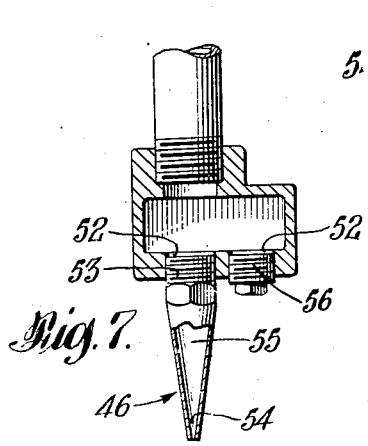
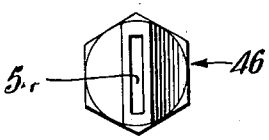

Patented Mar. 22, 1949

2,465,297

UNITED STATES PATENT OFFICE 2,465,297

PROCESS AND APPARATUS FOR DISPOSING OF METAL DESURFACING PRODUCTS

Ivan P. Thompson and John P. Cowie, Elizabeth, N. J., assignors to The Linde Air Products Company, a corporation of Ohio Application December 30, 1943, Serial No. 516,292

9 Claims. (Cl. 148—9.5)

This invention relates to a process and apparatus for disposing of the slag produced when thermochemically desurfacing metal bodies such as steel blooms, billets, slabs and the like, especially when such bodies are hot and in transit between metal working operations.

Metal bodies are conditioned to eliminate defective surface metal by machines that project gaseous heating and oxidizing streams obliquely against and progressively along the surfaces of the metal bodies. The desurfacing streams act thermochemically to convert a layer of surface metal into a hot molten product which is usually termed slag although it is usually a mixture of molten metal oxide and molten metal. The slag is projected along the surface of the metal body by the desurfacing gas streams and tends to accumulate and then fall off the metal surface in large lumps. Due to its often considerable metal content, such slag when it cools, forms lumps that are hard and very difficult to break up. The highly heated condition and the metal content also cause difficulties when it is attempted to collect slag by guide chutes, and so forth.

Desurfacing machines are customarily mounted in a conveyor line of a steel mill and have desurfacing blowpipe heads that project the desurfacing gas streams simultaneously against one or more of the surfaces of the bodies to be conditioned, which are propelled lengthwise through the machine. In some cases, the machine will desurface only the top surface of a body such as a slab, and when a relatively wide slab is desurfaced on its top surface, a relatively large quantity of slag tends to accumulate until it drops off the end of the slab. Attempts to dispose of such slag by having it drop into water resulted in slag explosions. Slabs are sometimes desurfaced on their under surface from which the slag will fall off by gravity only after being propelled by the desurfacing streams for an uncertain distance. To form proper driving support for the slabs, however, the conveyor rolls must not be too far apart, so that the conveyor roll in front of the desurfacing head will be in the path of the slag which impinges on the roll surface. Slag that impinges against a roll surface tends to adhere tenaciously and to interfere with operation of the conveyor. Attempts to deflect the slag by shields before it reaches the roll have not been satisfactory. Similar slag disposal problems exist in connection with the operation of machines desurfacing opposite side surfaces of the bodies or all four side surfaces of rectangular bodies, such as blooms and billets.

According to the invention, these difficulties are overcome by breaking up the slag into fine particles and cooling it soon after its production by the desurfacing gas streams. Such particles are then conveyed to collecting means and being in a desired form, are conveniently used in steel-making. The breaking up and cooling of the slag stream is accomplished by a fluid stream of suitable combination of mass and velocity directed transversely across the surface of the metal body being desurfaced in a position to impinge against and completely deflect the slag streams in a manner which breaks up the slag into small particles, chills it, and directs the particles transversely of the path of the metal body. Such cooling fluid stream may be a blast of compressed air of sufficient velocity, a blast of compressed air mixed with and carrying water in divided form, or usually more preferable, a stream of water of suitable size and velocity. The fluid stream is positioned sufficiently ahead of the desurfacing heads so as not to interfere with the reaction of the desurfacing stream with the surface metal, but preferably close to the reaction zone.

Many desurfacing machines are arranged to desurface metal bodies of successive different sizes. The nozzles for producing the fluid jets are preferably so supported that they are always in proper working relation to the respective desurfacing machine heads, and thereby in proper relation to the respective surfaces of the metal bodies.

Objects of the present invention, therefore, are to provide a method of and apparatus for disposing of solid products of a metal desurfacing operation; to provide a method of and apparatus for breaking up into small particles, cooling, and disposing of the slag produced when thermochemically desurfacing metal bodies; to provide a method and apparatus for deflecting laterally of the path of the metal body, the slag produced when desurfacing such bodies to protect the conveyor mechanism; to provide a method of and apparatus for converting the slag resulting from thermochemical desurfacing into a material which is easily handled and commercially useful; to provide an arrangement whereby slag breaking jets are always maintained in proper relation with respect to the surfaces of rectangular metal bodies; and to provide an arrangement of slag breaking nozzles in which the slag breaking streams are positioned so as not to adversely interfere with each other when operating on the four sides of rectangular metal bodies.

These and other objects and novel features of this invention will become apparent from the following description and the accompanying drawings, in which, Fig. 1 is a front elevational view showing diagrammatically an exemplary type of desurfacing machine for conditioning the four sides of rectangular bodies and having apparatus for disposing of the slag produced by the operation of the machine according to the invention;

Fig. 2 is a similar view on an enlarged scale of the slag disposing mechanism;

Fig. 3 is a plan view of the slag disposing mechanism illustrated in Fig. 2;

Fig. 4 is a front elevational view of a slag disposing system according to the invention arranged on a machine for desurfacing four sides of square billets when supported in the diamond position;

Fig. 5 is a front view showing slag disposing mechanism arranged on a machine for desurfacing the wide surface of slabs;

Fig. 6 is a front view on an enlarged scale of a nozzle with a part thereof broken away;

Fig. 7 is a view of a section on line 7—7 of Fig. 6; and

Fig. 8 is an end view of the nozzle of Fig. 6.

Referring now to the drawings, and particularly to Fig. 1, the metal body to be conditioned is illustrated in transverse cross section at W. The metal body W is a rectangular bloom which is being moved lengthwise through the machine, and as illustrated in Figs. 1 and 2, is moving away from the observer. The bloom W is supported upon one of its sides on a conveyor which is not illustrated in the interest of clearness of the drawing. A supporting roller for the bloom W however, is hidden by part of the desurfacing machine but is supported by a bearing bracket 10. The desurfacing machine is provided with as many desurfacing heads as there are sides of the bloom W to be conditioned. In the machine illustrated, there are four body sides being conditioned and the machine has a lower head 11, a left side head 12, an upper head 13, and a right side head 14. Each of these heads has a surface which is automatically maintained in contact with the side of the bloom. The width of each head is sufficient to desurface the entire side surface of the largest body on which the machine is designed to operate. Each of the heads is provided with a means for projecting a desurfacing stream against the respective sides of the bloom. Each such desurfacing stream is preferably formed by projecting streams of oxygen from a row of nozzle orifices O which are arranged to project individual oxygen streams S obliquely against and along the surface of the bloom. The individual oxygen streams S combine to form a single wide desurfacing gas stream.

A desurfacing machine of the type here illustrated is shown and described in United States Patent No. 2,276,329 of Alfred J. Miller, James H. Bucknam and William C. Widener. In order that such machine may be adjusted for different sizes of blooms and the like, the left head 12 is mounted on the same carrier plate with the upper head 13, which is adjustable vertically so that the left side of the upper head 13 moves along the bloom contacting surface of the head 12. The right side head 14 is mounted on the same carrier with the lower head 11 and is vertically adjustable thereon so that its bloom contacting surface moves along the right side surface of the lower head 11. The head carriers 15 and 16 are floatingly mounted upon a mechanism which is supported by the frame 17. As described in the aforesaid United States patent, the carriers 15 and 16 maintain the heads in operating contact with the bloom surfaces during operation, even though the bloom may vary in straightness or in its dimensions at various points along the length thereof. As illustrated in Fig. 2, the heads 11, 12, 13 and 14 are adjusted for desurfacing a smaller size bloom W than in Fig. 1.

In Fig. 3 it will be seen that the orifices O in each desurfacing head project desurfacing gas streams S obliquely against and along the surface of the billet or bloom W. The region of impingement of the streams S against the surface of the bloom W constitutes a reaction zone Z which extends for a short distance along the surface of the bloom. In the reaction zone Z the surface metal partially melts and partially combines with the oxygen to form the slag which flows from the reaction zone forwardly along the surface of the bloom W. Such slag stream is indicated at 19. To remove such slag streams 19, there are provided four cooling fluid jets 21, 22, 23, and 24 which are projected from nozzles 25, 26, 27 and 28 respectively. The nozzle 25 is maintained in a position to project the cooling fluid stream 21 transversely across the bottom surface of the bloom W with one side edge of the stream 21 closely adjacent to the bottom surface of the bloom W. The nozzle 25 is in front of the desurfacing heads and projects the stream 21 in a plane not very far forwardly of the reaction zone Z. Such plane is preferably close to the reaction zone in order to remove the slag promptly after it is produced so that the space between the resurfacing machine heads and the conveyor roll nearest thereto may be as small as practicable. Cooling fluid jet 21 intercepts and completely deflects the slag stream 19 and by such action the slag is broken up into small particles and rapidly chilled. The chilled slag particles are carried away by the cooling fluid stream.

The nozzle 25 is preferably mounted to the left of lower head 11. The nozzle 27 for producing the fluid stream 23 is then preferably mounted at the left side of the upper head 13 and maintained in a proper position for projecting the stream 23 transversely across the top surface of the bloom W. The nozzles 26 and 28 are mounted above the bloom W and arranged to project the streams 22 and 24 downwardly and transversely across the side surfaces of the bloom W. These nozzles must be positioned so that the stream 22 will not interfere with the streams 21 and 23 and so that the stream 24 will not interfere with the stream 23. To this end, the nozzles 26 and 28 project the streams 22 and 24 preferably in a plane which is different from the plane of the streams 21 and 23. As indicated in Fig. 3, the plane of the streams 21 and 23 is at an angle to the plane of the streams produced by nozzles 26 and 28. Obviously, the planes could be parallel but spaced apart.

In order that the cooling fluid streams may be maintained in accurate relation to the bloom surfaces even though the size of the bloom may vary, the nozzles are preferably mounted on certain of the desurfacing heads for movement therewith. Nozzle 25 is mounted on the end of a supply conduit 30 which is secured by brackets 31 to portions of the head 12. Since the lower side of the head 12 is always maintained at the level of the bottom surface of the bloom W, the nozzle 25 will always be at the proper relation to such bottom surface. The nozzles 26 and 27 which are adjacent the upper left corner of the bloom W formed by the left and upper sides of the bloom, are mounted on a manifold 32 which is at the end of a supply conduit 33. The supply conduit 33 is secured by brackets 34 to portions of the upper head 13. The left side of the upper head 13 is always flush with the left side of the bloom W and therefore the upper nozzle 26 will be always in proper relation with the left side of the bloom W. Likewise the work contacting surface of the upper head 13 will be always at the level of the upper side of the bloom W and therefore the nozzle 27 will be maintained in proper relation to the upper surface of the bloom W. The nozzle 28 is secured at the end of a supply conduit 35 which is secured by brackets 36 to the vertically adjustable right side head 14. It will be seen that such mounting of the nozzles 25, 26, 27, and 28 also maintains the ends of the nozzles at the proper distance from the bloom.

The slag streams 22 and 24 carry the slag particles vertically downward and into a slag collector or a slag chute that conveys it to a slag pit which is not illustrated in the drawing in the interest of clearness. The streams 21 and 23 carry the slag particles horizontally and are preferably deflected so as to convey the slag particles to the same slag collector or chute directly below the bloom W. For this purpose there is provided a deflector indicated generally at 38. The deflector has a target surface 39 in a position to be impinged by the streams 21 and 23. The surface 39 is preferably at an angle to the horizontal no greater than 55 degrees, it having been found that any angle greater than this tends to cause too much splashing. A preferred angle is 52 degrees which causes the streams 23 and 21 to be deflected downwardly so as to flow along the target surface 39. The target surface 39 has a smoothly curved lower portion that joins a chute 40 for conveying the cooling fluid streams and the particles carried thereby downwardly toward the slag pit directly below the bloom W. The deflector 38 is preferably provided with rolled-inward edges 41 to retain the cooling fluid that tends to spread out on the surface 39.

Referring to Fig. 4, there is illustrated an arrangement of slag breaking nozzles mounted on a machine of the type illustrated in Fig. 8 of the aforesaid United States Patent No. 2,276,329. In such case the bloom W1 is square in section and is mounted for lengthwise movement in the diamond position. Only the blowpipe heads of the desurfacing machine are indicated. The heads 111, 112, 113 and 114 are mounted for adjustment relatively to each other so that different sizes of blooms W1 can be conditioned. In this arrangement all the slag breaking cooling streams are directed downwardly so that it is easy to deflect such streams into a slag pit below the bloom W1. Thus, a slag breaking jet 121 is projected across the lower left surface of the bloom W1 and is formed by the nozzle 125 secured to a supply conduit 130 that is mounted for movement on the head 112. The jet 123 is projected from a nozzle 127 positioned so that the jet flows transversely across the upper right surface of the bloom, and the jet 122 is projected from a nozzle 126 which is positioned to project the jet across the upper left surface of the bloom. The nozzles 126 and 127 are mounted on a manifold 132 secured on the supply conduit 133 which is mounted for movement on the head 113. The nozzle 128 is secured at the end of the conduit 135 mounted for movement with the head 114, and projects a slag breaking stream 124 transversely across the lower right side of the bloom W1. The nozzles 125 and 127 are arranged to project their jets in a plane which is forward of the plane of the jets 122 and 124. Alternatively the nozzles 125 and 128 may be positioned so that the jets 121 and 124 do not intersect the jets 122 and 123 but do intersect with each other at the lower corner of the bloom so as to deflect each other downwardly.

Fig. 5 illustrates the arrangement of the slag breaking nozzle when desurfacing the surface of a slab such as the slab W2. A roller that supports the slab W2 is indicated at 43. A desurfacing head 44 of sufficient width operates on the top surface of the slab W2, and forms a slag stream that is projected forwardly on the slab. A slag breaking jet of cooling fluid 45 is projected horizontally across the top surface of the slab W2 from one side thereof, from a nozzle 46 which is mounted on a supply manifold 47. The supply manifold 47 is preferably mounted to move in unison with the heads 44 so that the jet 45 is maintained in proper operating relation with the upper surface of the slabs irrespective of the thickness of the slab. At the side of the slab opposite the nozzle 46 is positioned a funnel 48 having an opening 49 into which the slag stream 45 is projected. The funnel 49 is joined to a slag chute 50 which conducts the cooling fluid and slag particles collected by the funnel to a slag collector or slag pit below the conveyor table. In the event that the bottom surface of the slab W2 is desurfaced, the slag breaking jet will be applied across the bottom surface of the slab between the table roller 43 and the desurfacing heads. The location of a nozzle 51 for providing a slag breaking jet for the under surface of the slab is indicated in broken lines in Fig. 5. Such nozzle 51 could be stationarily mounted with respect to the conveyor table since the under surface of slabs of any thickness will be always at the same level, but it may be preferable to mount nozzle 51 so as to move with the blowpipe unit and thereby be adjusted in proper relation to the bottom of a slab that is warped or cambered.

Figs. 6 to 8 illustrate a form of nozzle which is preferably employed when the cooling fluid used is water. The manifold chamber 47 is provided with a supply conduit 48 and has along one end thereof threaded openings 52 for receiving one or more nozzles 46. Each nozzle 46 has a round threaded inlet end 53 for engagment in the openings 52. The nozzles 46 are provided with discharge orifices 54 that are transversely elongated and slot-like, and the passage 55 through the nozzle changes from a circular form at the inlet end to the slotted form at the discharge end. This form of nozzle used with water provides a compact, ribbon-like stream of water. The ribbon-like form of stream is found preferable when the cooling fluid is water, and when a ribbon-like stream is used, the narrow side edge of the stream is positioned adjacent the surface of the body being conditioned.

If the body surface is narrow a single slag breaking stream may be sufficient. When the surface being conditioned is wide such as that of a slab, it will be found advantageous to reenforce the single stream of cooling fluid by a second stream flowing parallel to the first stream and positioned on the side of the first stream away from the desurfacing heads. The necessity for using a second stream will be indicated by noting if the first slag breaking stream is deflected too much by the slag.. Thus, when two streams are required both openings 52 of the manifold 47 will be occupied by nozzles 46. If, however, only one nozzle is needed, one of the openings 52 may be filled by a plug 56. Obviously, any number of nozzles may be employed according to the number of streams necessary to completely deflect the slag produced on a wide surface. The number of nozzles used in any one position will also depend upon the presure of the cooling fluid available; for example, with high pressure the cooling fluid stream will carry further and fewer streams will be needed to carry completely across the slab without excessive deflection.

In order to disclose the broad principles of the invention, several embodiments thereof have been illustrated and described. Obviously, certain features of the invention may be used independently of others and changes may be made in various parts of the apparatus without departing from the essentials of the invention. For example, although the process and apparatus is described as particularly suitable when desurfacing ferrous metal bodies by oxidizing gas streams, it will be understood that the same principles are applicable to desurfacing or conditioning bodies of other metals by any desurfacing streams that produce a fluid slag; and the process also is applicable whether the desurfacing stream is a single stream, a composite stream formed by a row of orifices, or a wide stream formed by a slot-like orifice.

What is claimed is:

1. In a process of thermochemically removing metal from a top substantially horizontal surface of an elongated metal body by directing a desurfacing jet obliquely against and lengthwise of such surface while said body is moved longitudinally relatively to said jet thereby producing a stream of molten slag upon and extending along said surface ahead of a reaction zone of said jet on said surface, the combination therewith of the improvement which comprises the step of progressively removing such slag from said surface on which formed by directing a fluid stream transversely of said surface against one side of such slag stream during such relative movement of said body and jet while maintaining such fluid stream spaced from and in front of said reaction zone with the momentum of such fluid stream sufficient to break up such slag and to push such slag laterally off of said surface and with the underside of said fluid stream contiguous said surface.

2. In a process of thermochemically removing metal from a surface of an elongated metal body by directing a desurfacing jet obliquely against and lengthwise of such surface while said body is moved horizontally relatively to said jet thereby producing a stream of molten slag upon and extending along said surface ahead of the reaction zone of said jet on said surface, the improvement which comprises the step of progressively removing such slag from said surface on which the slag is formed during such relative movement by directing a compact stream of water transversely of said surface and against one side of such slag stream during such relative movement of said body and jet while maintaining the axis of such compact water stream along a line substantially parallel to said surface and spaced from said reaction zone and while maintaining the momentum of such compact water stream at a value sufficient to break up such slag stream and to push such slag laterally off of said surface.

3. In a process of thermochemically removing metal from a surface of an elongated metal body by directing a desurfacing jet obliquely against and lengthwise of such surface while said body is moved on conveyor rolls longitudinally relatively to said jet thereby producing a stream of molten slag upon and moving along said surface ahead of a reaction zone of said jet on said surface under the influence of said jet and also under the influence of gravity tending to pull slag off said surface, the combination therewith of the improvement which comprises the step of progressively removing such slag at a particular location during such relative movement by directing a fluid stream transversely of said surface against one side of such slag stream during such relative movement of said body and jet at a position close to and in front of said reaction zone with momentum of such fluid stream sufficient to break up such slag stream and to push such slag laterally off of said surface on which the slag is formed before gravity can pull said slag stream off said surface and before the slag stream reaches a conveyor roll which is forward of said reaction zone and with the adjacent side of said slag breaking stream contiguous the work surface to completely deflect the slag thereon.

4. In a process of thermochemically removing metal from a horizontal surface of an elongated metal body by directing a desurfacing jet obliquely against and lengthwise of such surface while said body is moved horizontally relatively to said jet thereby producing a stream of molten slag upon and moving along said surface ahead of a reaction zone of said jet on said surface, the combination therewith of the improvement which comprises the step of progressively removing such slag from said surface on which formed during such relative movement by directing a stream of liquid transversely of said surface and against one side of such slag stream while maintaining the adjacent side of said liquid stream contiguous to said surface in front of said reaction zone with the momentum of such liquid stream sufficient to break up such slag stream and to push such slag laterally off of said surface.

5. The process according to claim 4 in which the broken slag after leaving said horizontal surface is deflected downwardly at an angle of substantially 52° to the horizontal to reduce the splash of impact on a deflector surface.

6. The process according to claim 4 in which said body is wide and a second slag breaking stream of liquid is parallel to, spaced from, but adjacent to the first stream to effect a complete deflection of the slag by both streams when the first stream alone is inadequate to effect such complete deflection of slag, the sides of both slag breaking streams adjacent said surface being contiguous thereto.

7. The process according to claim 4 in which the slag is removed from the top horizontal surface of the metal body by a slag breaking stream which engages the slag stream at an acute angle to a line in the direction of movement of the slag stream with the slag breaking stream having a component of motion forwardly in the direction of movement of the molten slag stream along said surface.

8. In an apparatus for thermochemically removing metal from a flat surface of an elongated metal body having a desurfacing nozzle positioned to direct a jet of desurfacing gas longitudinally of the work at an acute angle to said surface, conveyor rolls on which the work is fed to said nozzle with the formation of a stream of molten slag issuing from a reaction zone adjacent the impingement of said desurfacing jet upon said surface, the desurfacing jet having sufficient momentum to move the slag stream forward along said body, the combination therewith of the improvement for breaking up, completely deflecting, removing and cooling the slag to prevent its uncertain falling off said surface onto an adjacent conveyor roll, said improvement comprising a nozzle for a slag breaking stream provided with an orifice and located off a longitudinal edge of said surface close to but forward of the desurfacing nozzle and a reaction zone formed thereby but behind the conveyor roll which is immediately forward of the desurfacing nozzle for directing a liquid stream transversely of the metal body and of the slag stream against a side of said slag stream under sufficient momentum to break up, cool, completely deflect, and remove the slag stream from said surface where formed before the slag reaches the conveyor roll next forward of the desurfacing nozzle, said nozzle for the slag breaking stream having an edge of its orifice in the plane of said surface whereby a liquid stream issuing therefrom has its adjacent side contiguous said surface to completely deflect and remove slag therefrom before slag may fall on said adjacent conveyor roll, the nozzle for the slag breaking stream being close to said reaction zone and desurfacing nozzle whereby a conveyor roll adjacent and forward of said desurfacing nozzle may be closely spaced from said desurfacing nozzle with freedom from slag falling on any such roll.

9. In an apparatus for thermochemically removing metal from a horizontal surface of an elongated metal body, said apparatus having a desurfacing nozzle positioned to direct a jet of desurfacing gas longitudinally of the work at an acute angle to said surface, conveyor rolls on which the work is fed to said nozzle with the formation of a stream of molten slag issuing from a reaction zone adjacent the impingement of the desurfacing jet upon said surface, the desurfacing jet having sufficient momentum to move the slag stream forward along the work, the combination therewith of the improvement for breaking up and removing the stream of molten slag to prevent its falling off said surface onto an adjacent conveyor roll, said improvement comprising a nozzle for a slag breaking stream provided with an orifice and located off a longitudinal edge of said surface close to but forward of the desurfacing nozzle and the reaction zone formed thereby but behind the conveyor roll which is immediately foward of the desurfacing nozzle for directing a liquid stream transversely of the metal body and of the slag stream against a side of the slag stream under sufficient momentum to break up and remove the slag stream from said surface where it is formed before the slag reaches the conveyor roll next forward of the desurfacing nozzle, the slag breaking stream nozzle orifice having an axis coincident with a line extending across, parallel to, and adjacent to the surface of a body undergoing desurfacing, said nozzle for the slag breaking stream having an edge of its orifice in the plane of said surface whereby a liquid stream issuing therefrom has its adjacent side contiguous said surface to completely deflect the slag therefrom before said slag may fall on a conveyor roll, said nozzle for the slag breaking stream being close to said reaction zone and desurfacing nozzle whereby the conveyor rolls adjacent said desurfacing nozzle may be closely spaced with freedom from slag falling on them, and a collector chute for receiving the slag pushed off said surface and having a surface in the path of said stream and arranged at an angle of not more than 55° to the horizontal to reduce splash on impact of the liquid and broken slag upon the chute surface.

IVAN P. THOMPSON.
JOHN P. COWIE.

REFERENCES CITED

The following references are of record in the file of this patent:

UNITED STATES PATENTS

| Number | Name | Date |
|---|---|---|
| 1,585,893 | Coberly | May 25, 1926 |
| 2,157,313 | Alles et al. | May 9, 1939 |
| 2,165,573 | Pfeil | July 11, 1939 |
| 2,168,581 | Pufahl et al. | Aug. 8, 1939 |
| 2,218,141 | Adams et al. | Oct. 15, 1940 |
| 2,286,192 | Aitchison et al. | June 16, 1942 |
| 2,287,103 | Jones | June 23, 1942 |
| 2,306,370 | Anderson | Dec. 29, 1942 |
| 2,323,977 | Chelborg et al. | July 13, 1943 |

FOREIGN PATENTS

| Number | Country | Date |
|---|---|---|
| 568,934 | Germany | Jan. 26, 1933 |